United States Patent
An et al.

(10) Patent No.: US 12,246,589 B2
(45) Date of Patent: Mar. 11, 2025

(54) VEHICLE BODY HAVING HIGH VOLTAGE BATTERY

(71) Applicants: HYUNDAI MOTOR COMPANY, Seoul (KR); KIA CORPORATION, Seoul (KR)

(72) Inventors: Seung Won An, Seoul (KR); Young Jun Kim, Seoul (KR); Jong Jin Choi, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 831 days.

(21) Appl. No.: 17/377,681

(22) Filed: Jul. 16, 2021

(65) Prior Publication Data

US 2022/0144059 A1 May 12, 2022

(30) Foreign Application Priority Data

Nov. 12, 2020 (KR) .................. 10-2020-0151287

(51) Int. Cl.
 *B60K 1/04* (2019.01)
 *B62D 25/02* (2006.01)

(52) U.S. Cl.
 CPC .............. *B60K 1/04* (2013.01); *B62D 25/025* (2013.01); *B60K 2001/0438* (2013.01); *B60L 2240/547* (2013.01)

(58) Field of Classification Search
 CPC .............. B60K 1/04; B60K 2001/0438; B60K 2001/0405; B60Y 2306/01; B60L 50/64; H01M 2200/20; H01M 50/20; H01M 50/249; B62D 25/025; B62D 25/2036; B62D 25/00
 See application file for complete search history.

(56) References Cited

U.S. PATENT DOCUMENTS

| | | | |
|---|---|---|---|
| 5,501,289 A | 3/1996 | Nishikawa et al. | |
| 10,207,573 B2 | 2/2019 | Hara | |
| 10,547,039 B2* | 1/2020 | Toyota | B60K 1/04 |
| 2010/0264701 A1* | 10/2010 | Ohkubo | B62D 25/087 |
| | | | 296/205 |
| 2017/0057549 A1* | 3/2017 | Saeki | B62D 25/2036 |
| 2018/0043763 A1 | 2/2018 | Suzumori | |
| 2018/0065461 A1* | 3/2018 | Maier | B62D 25/2018 |
| 2018/0236863 A1* | 8/2018 | Kawabe | B60K 1/04 |
| 2019/0061507 A1* | 2/2019 | Nitta | B60L 50/66 |
| 2019/0248423 A1* | 8/2019 | Kato | B62D 25/025 |
| 2021/0016649 A1* | 1/2021 | Sasmaz | H01M 50/262 |

FOREIGN PATENT DOCUMENTS

| | | |
|---|---|---|
| JP | 3324172 B2 | 9/2002 |
| JP | 2007-230459 A | 9/2007 |
| JP | 4399675 B2 | 1/2010 |

(Continued)

*Primary Examiner* — James A English
(74) *Attorney, Agent, or Firm* — Morgan, Lewis & Bockius LLP

(57) ABSTRACT

A vehicle body having a high voltage battery may include a load path formed by a reinforcing frame provided between a vehicle body frame and a battery frame and the battery frame may be installed on the vehicle body frame via the reinforcing frame, improving the robustness and collision rigidity of the battery frame.

15 Claims, 7 Drawing Sheets

(56) References Cited

FOREIGN PATENT DOCUMENTS

| | | |
|---|---|---|
| JP | 2011-124101 A | 6/2011 |
| JP | 2017-193289 A | 10/2017 |
| JP | 2018-140711 A | 9/2018 |
| JP | 6520808 B2 | 5/2019 |
| KR | 10-1373599 A | 3/2014 |

* cited by examiner

VEHICLE BODY HAVING HIGH VOLTAGE BATTERY

CROSS REFERENCE TO RELATED APPLICATION

The present application claims priority to Korean Patent Application No. 10-2020-0151287, filed Nov. 12, 2020, the entire contents of which is incorporated herein for all purposes by this reference.

BACKGROUND OF THE INVENTION

Field of the Invention

The present invention relates to a vehicle body provided with a high voltage battery, and more particularly, to a vehicle body provided with a high voltage battery, in which the high voltage battery is prevented from damage during a side collision of a vehicle.

Description of Related Art

In recent years, interest in eco-friendly vehicles is increasing due to environmental problems, high oil prices, and the like, and electric vehicles (EVs) driven using electrical energy have been developed in various ways.

As such electric vehicles, a battery powered EV, a fuel cell EV using a fuel cell as an electric power source, and a hybrid EV using an electric motor and an engine are being developed.

The electric vehicles are provided with a battery module for storing electrical energy, in which a plurality of battery cell units is accommodated in a battery housing. Such a battery module needs to prevent damage to the battery cell units from external shock.

Meanwhile, generally, a front side member is only provided as a protector for the high voltage battery mounted on the vehicle body floor in preparation of a front collision. However, in the event of a side collision of a vehicle, it is difficult to protect the high voltage battery only with the front side member, causing a problem in that the high voltage battery is damaged as the shock is directly transferred to the high voltage battery along with the deformation of the vehicle body.

In particular, in the case where parts such as a sliding door or a door step are mounted on the side of the vehicle, it is difficult to secure rigidity against a side collision because of a lack of a robust side sill structure on the side of the vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle body with a high voltage battery, in which the battery is prevented from damage by dispersing the impact during a side collision of a vehicle.

In various aspects of the present invention, the present invention is directed to providing a vehicle body having a high voltage battery, including: a vehicle body frame having a pair of first side sill sections extending in a longitudinal direction of the vehicle body and disposed on opposite sides of the vehicle body, respectively, and a pair of second side sill sections disposed outward and downward from the first side sill sections, respectively, to define a mounting space for side parts, along with the first side sill sections; a battery frame located below the vehicle body frame and having opposite side sections, between which the battery is configured to be accommodated, and a plurality of mounting features by which the battery frame is fastened to a lower portion of the vehicle body frame; and a reinforcing frame located between the vehicle body frame and the battery frame and having a pair of side reinforcing members extending along the side sections of the battery frame on an external side from the side sections and fastened to the side sections and the second side sill sections, and a cross-reinforcing member extending across the battery frame and coupled to the side reinforcing members and fastened to a lower portion of the vehicle body frame by the mounting features of the battery frame.

The vehicle body frame may be configured in a multi-purpose vehicle in which side parts including a sliding door or a door step are mounted in the mounting space.

The side section may be provided with a connection end portion extending downwards from the side reinforcing member so that the connection end portion and the side reinforcing member are fastened together via vertical bolting or riveting.

The mounting features may be disposed in the longitudinal direction in the battery frame, and a plurality of cross-reinforcing members may be provided to connect the side reinforcing members such that some of cross-reinforcing members pass through the mounting features.

When the cross-reinforcing members pass through the mounting features, the mounting features may vertically penetrate through the cross-reinforcing members, and a reinforcement rib may be formed to surround the penetrated mounting feature.

The side reinforcing member may be provided with a fastening end portion extending downwards from the second side sill section so that the fastening end portion and the second side sill section are fastened together via vertical bolting or riveting.

The cross-reinforcing member may extend across the opposite reinforcing members on an upper side of the battery frame, and may have, on both end portions thereof, an upper engaging portion engaged with an upper side of the side reinforcing member and a side engaging portion engaged with an internal side of the side reinforcing member.

The reinforcing frame may further include a connection bracket connecting the cross-reinforcing member and the first side sill section to each other.

According to the vehicle body holding the high voltage battery having the structure as described above, a load passes through the reinforcing frame provided between the vehicle body frame and the battery frame and the battery frame is installed on the vehicle body frame via the reinforcing frame, improving the robustness and collision rigidity of the battery frame.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
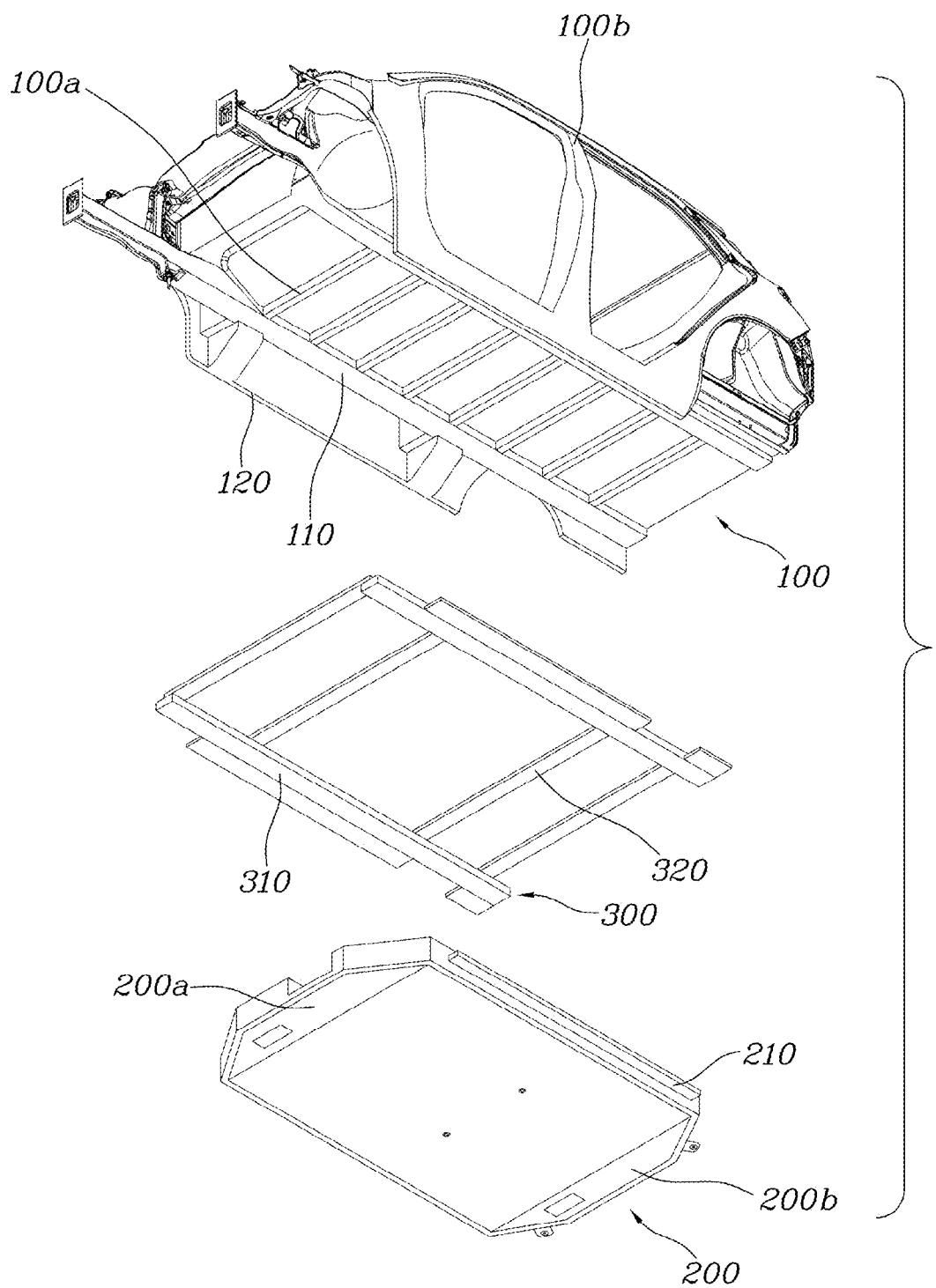
FIG. 1 and FIG. 2 are views exemplarily illustrating a vehicle body provided with a high voltage battery according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, exemplary embodiments of the present invention will be described in detail with reference to the accompanying drawings.

Figure 2:
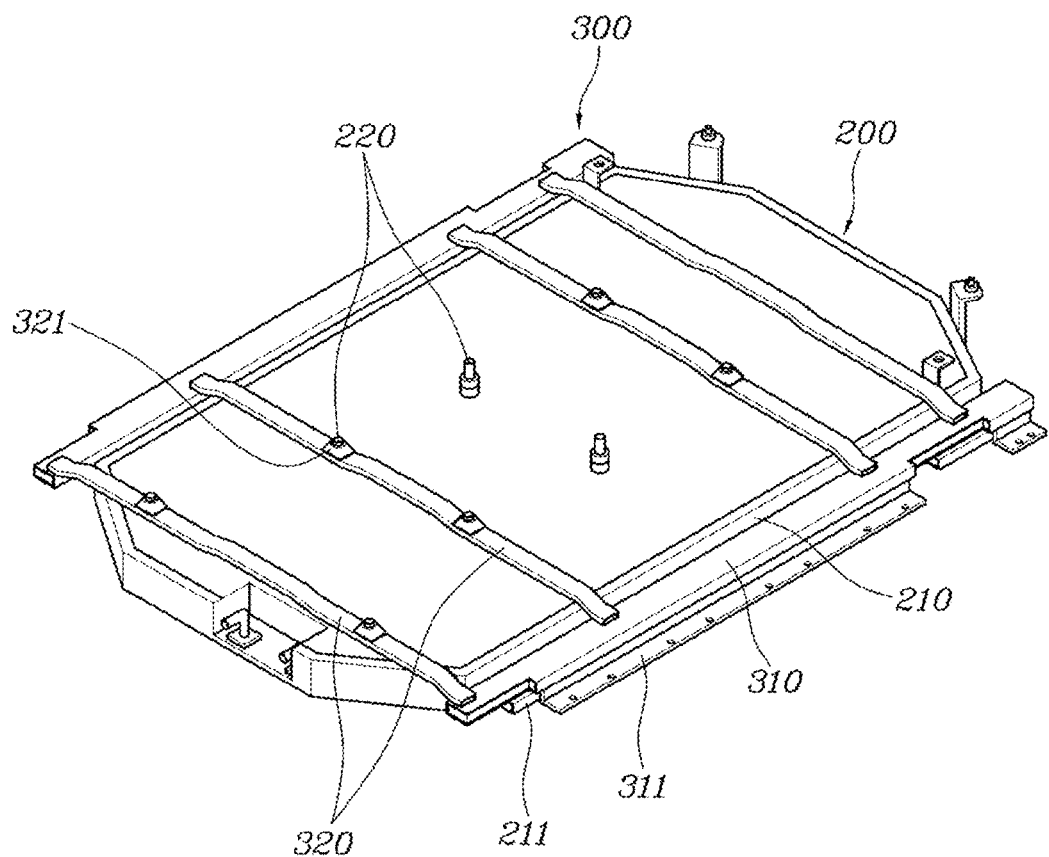
Figure 3:
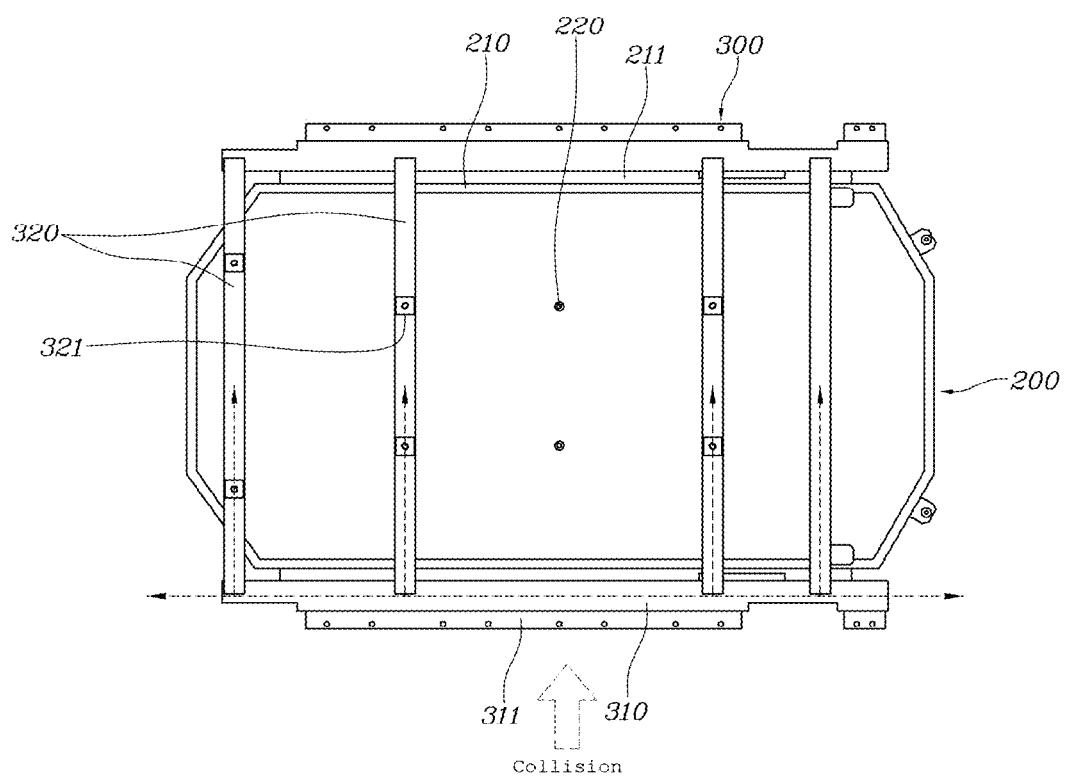
FIG. 3 is a view exemplarily illustrating a load path of the vehicle body of FIG. 1.
Figure 4:
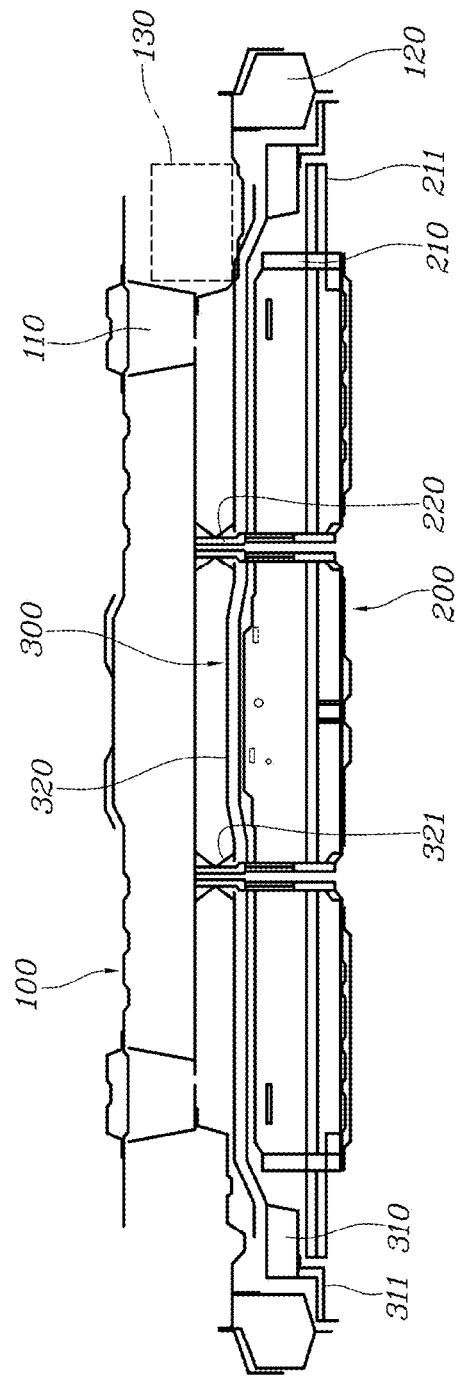
FIG. 4 is a cross-sectional view of the vehicle body of FIG. 1.
Figure 5:
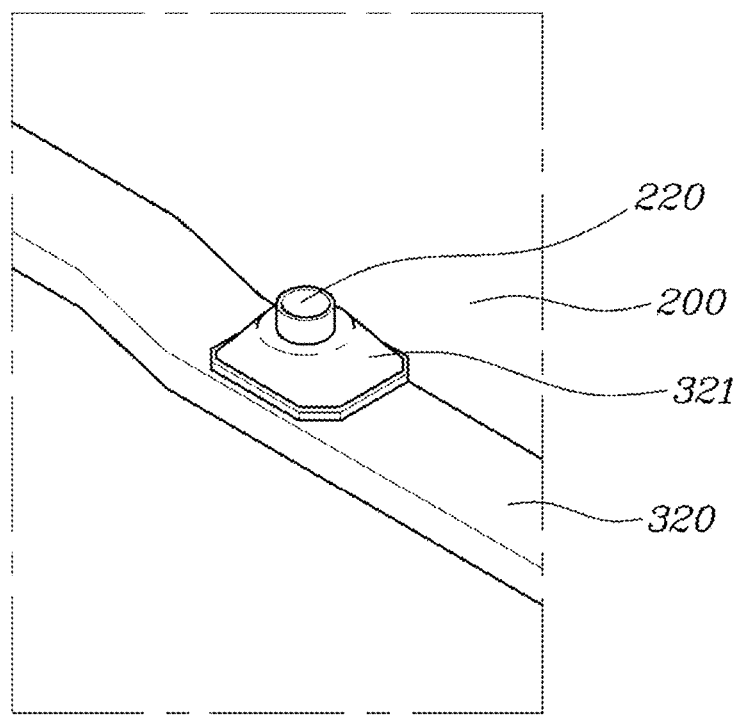
FIG. 5 is a view exemplarily illustrating a reinforcing rib of the vehicle body of FIG. 1.
Figure 6:
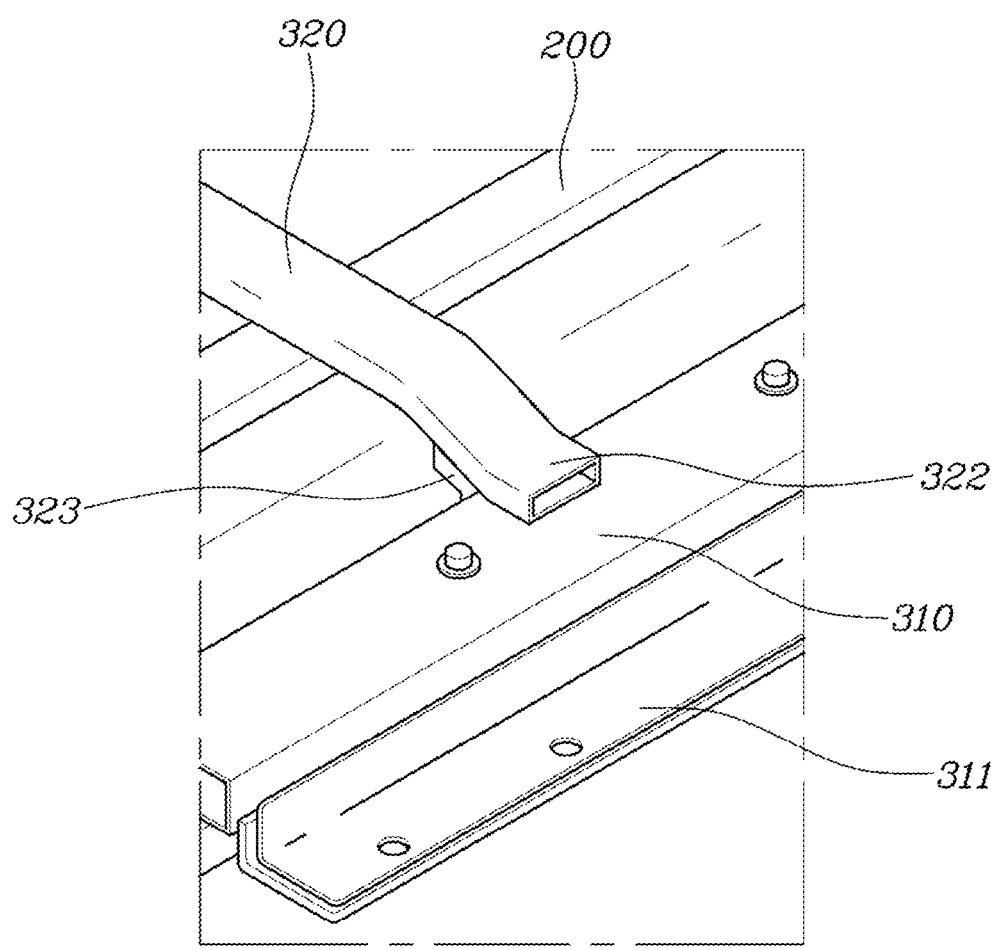
FIG. 6 is a view exemplarily illustrating an engaging portion of the reinforcing frame according to the vehicle body of FIG. 1.
Figure 7:
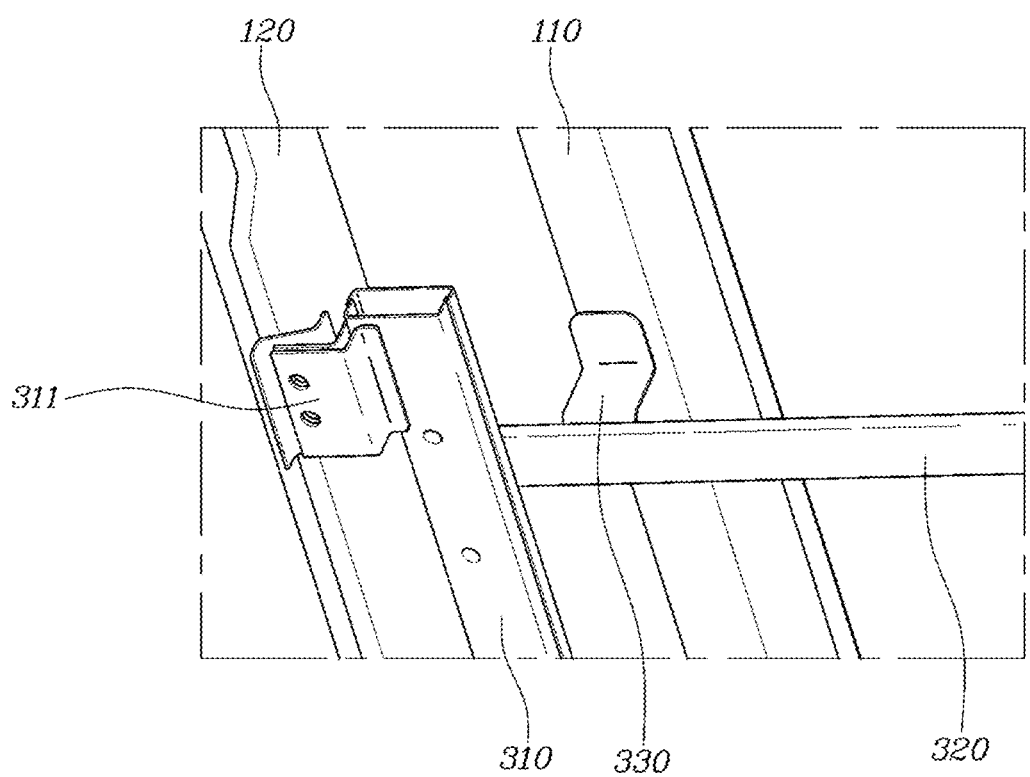
FIG. 7 is a view exemplarily illustrating a connection bracket of the vehicle body of FIG. 1.

FIGS. 1 to 2 are views exemplarily illustrating a vehicle body provided with a high voltage battery according to various exemplary embodiments of the present invention; FIG. 3 is a view exemplarily illustrating a load path of the vehicle body of FIG. 1; FIG. 4 is a cross-sectional view of the vehicle body of FIG. 1; FIG. 5 is a view exemplarily illustrating a reinforcing rib of the vehicle body of FIG. 1; FIG. 6 is a view exemplarily illustrating an engaging portion of the reinforcing frame according to the vehicle body of FIG. 1; and FIG. 7 is a view exemplarily illustrating a connection bracket of the vehicle body of FIG. 1.

As illustrated in FIG. 1, FIG. 2, FIG. 3, and FIG. 4, a vehicle body having a high voltage battery includes: a vehicle body frame 100 having a pair of first side sill sections 110 extending in a longitudinal direction of the vehicle body and disposed on opposite sides of the vehicle body, respectively, and a pair of second side sill sections 120 disposed outward and downward from the first side sill sections 110, respectively, to define a mounting space 130 for side parts thereof, along with the first side sill sections 110; a battery frame 200 located below the vehicle body frame 100 and having opposite side sections 210, between which a battery is accommodated, and a plurality of mounting features 220 by which the battery frame is fastened to a lower portion of the vehicle body frame 100; and a reinforcing frame 300 located between the vehicle body frame 100 and the battery frame 200 and having a pair of side reinforcing members 310 extending along the side sections 210 of the battery frame 200 on the external side from the side sections 210 and fastened to the side sections 210 and the second side sill sections 120, and a cross-reinforcing member 320 horizontally extending across the battery frame 200 and coupled to the side reinforcing members 310 and fastened to a lower portion of the vehicle body frame 100 by the mounting features 220 of the battery frame 200.

As described above, the vehicle body according to various exemplary embodiments of the present invention includes the vehicle body frame 100, the battery frame 200, and the reinforcing frame 300. Here, the vehicle body frame 100 corresponds to the vehicle body floor, and includes the first side sill sections 110 disposed on opposite sides thereof and the second side sill sections 120 disposed outward and downward from the first side sill sections 110. The vehicle body frame 100 may have various members constituting the vehicle body, such as a cross member 100a extending laterally to connect the first side sill sections 110, a pillar member 100b extending upward, or the like. The vehicle body frame 100 defines the mounting space 130 for side parts with the second side sill sections 120 together with the first side sill sections 110. Here, the side part may include a sliding door or a door step, and the mounting space 130 is formed by the first side sill section 110 and the second side sill section 120, so that the side parts can be mounted therein. That is, the vehicle body frame 100 is configured in a multi-purpose vehicle, and in the case of a multi-purpose vehicle having side parts, the side collision strength is lowered, and thus the reinforcing frame 300 is provided to compensate for side collision vulnerability.

On the other hand, the battery frame 200 is located below the vehicle body frame 100 and has opposite side sections 210 on both sides. The battery frame 200 may include a front portion 200a and a rear portion 200b connecting the side sections 210 on both sides, and a battery is held between the side section 210 so that the battery can be protected. Furthermore, the battery frame 200 is provided with the mounting features 220 for mounting on the vehicle body frame 100, so that the battery frame may be bolted or riveted to the vehicle body frame 100 via the mounting features 220.

In particular, according to various exemplary embodiments of the present invention, the reinforcing frame 300 is provided between the vehicle body frame 100 and the battery frame 200 to reinforce the rigidity of the battery frame 200. The reinforcing frame 300 includes the side reinforcing members 310 extending along the side sections 210 on the external side of the side sections 210 of the battery frame 200 and fastened to the side sections 210 and the second side sill sections 120, and the cross-reinforcing members 320 horizontally extending across the battery frame 200 and connected to the side reinforcing members 310, and fastened to a lower portion of the vehicle body frame via the mounting features 220 of the battery frame 200. Such a reinforcing frame 300 performs a load pass through the side reinforcing members 310 and the cross-reinforcing members 320, so that a collision load occurring during a vehicle side collision is distributed from the side reinforcing members 310 to the cross-reinforcing members 320, securing collision rigidity.

As the side reinforcing members 310 of the reinforcing frame 300 are located outside the side sections 210 of the battery frame 200, a direct collision with the battery frame 200 is avoided during a vehicle side collision, and as the load pass occurs through the cross-reinforcing members 320 connected to the side reinforcing members 310, the collision load is distributed to reduce damage to the battery case.

Furthermore, as the side reinforcing members 310 of the reinforcing frame 300 are fastened to the side sections 210 and the second side sill sections 120, the coupling rigidity between the vehicle body frame 100 and the battery frame 200 is secured, and as the mounting features 220 fastened to the vehicle body frame 100 pass through the cross-reinforcing members 320, the fastening strength of the mounting features 220 is secured.

In the present way, in the vehicle body, during a side collision, the collision load is distributed via the load path by the reinforcing frame 300 so that the battery frame 200 is protected from the shock, and fastening strength between the battery frame 200 and the vehicle body frame 100 is ensured.

As can be seen in FIG. 2, the side section 210 has a connection end portion 211 extending downward from the side reinforcing member 310, so that the connection end portion 211 and the side reinforcing member 310 may be fastened together by perpendicular bolting or riveting.

In the present way, the connection end portion 211 extends from the side section 210 of the battery frame 200 and the side reinforcing member 310 of the reinforcing frame 300 is seated onto the connection end portion 211, so that it is ready to couple the reinforcing frame 300 and the battery frame 200 and the coupling rigidity of the battery frame 200 and the reinforcing frame 300 is secured. The battery frame 200 is vertically bolted or riveted to the side reinforcing member 310 of the reinforcing frame 300 through the connection end portion 211, so that the battery frame 200 and the reinforcing frame 300 are easily fastened together, and a direct impact to bolted or riveted parts are prevented during a side collision, securing accident safety. Furthermore, since the side section 210 of the battery frame 200 and the side reinforcing member 310 of the reinforcing frame 300 are not directly fastened, the impact transferred to the side reinforcing member 310 during a side collision is not transferred to the side sections 210, but the load pass occurs through the cross reinforcement members 320, reducing the impact.

Meanwhile, the battery frame 200 is provided with a plurality of mounting features 220 disposed in the longitudinal direction thereof While the mounting features 220 are provided in longitudinally spaced pairs at the center portion of the battery frame 200, the number and mounting position of the mounting features 220 may change depending on the required fastening rigidity between the battery frame 200 and the vehicle body frame 100.

In the reinforcing frame 300, a plurality of cross-reinforcing members 320 is provided in the longitudinal direction to connect the side reinforcing members 310 such that some of cross-reinforcing members 320 are disposed to pass through the mounting features 220. The cross-reinforcing members 320 form a load path together with the side reinforcing members 310. Here, as some of the cross-reinforcing members 320 are disposed to pass through the mounting features 220, the mounting features 220 penetrate through and is supported by the cross-reinforcing members 320. Accordingly, as the mounting features 220 of the battery frame 200 are supported by the cross-reinforcing members 320 of the reinforcing frame 300, rigidity is secured and a stable coupling structure can be maintained.

In an exemplary embodiment of the present invention, a portion of the cross-reinforcing members 320 through which the mounting features 220 pass is disposed lower than another portion of cross-reinforcing members 320 through which the mounting features 220 pass to form a convexly curved shape, as shown in FIG. 2 so that a vertical load applied to the cross-reinforcing members 320 can be absorbed by the cross-reinforcing members 320.

Furthermore, as can be seen in FIG. 5, in the case of the cross-reinforcing members 320 passing through the mounting features 220, the mounting features 220 penetrate through the cross-reinforcing members in the vertical direction thereof, and reinforcing ribs 321 are provided to surround the penetrated mounting features 220. These reinforcing ribs 321 may be formed on the cross-reinforcing members 320 to surround the mounting features 220. When the reinforcing rib has an upward inclination, the mounting features 220 can be supported more stably.

On the other hand, the side reinforcing member 310 is provided with a fastening end portion 311 extending downward from the second side sill section 120 so that the second side sill section 120 is seated on and fastened to the fastening end portion 311 through vertical bolting or riveting.

In the present way, by forming a structure in which the fastening end portion 311 extends from the side reinforcing member 310 of the reinforcing frame 300 and the second side sill section 120 of the body frame 100 is seated on the fastening end portion 311, it is easy to combine the reinforcement frame 300 and the vehicle body frame 100, and the fastening rigidity of the reinforcing frame 300 and the vehicle body frame 100 is secured. The reinforcing frame 300 is vertically bolted or riveted to the second side sill section 120 of the vehicle body frame 100 through the side reinforcing member 310, so that the reinforcing frame 300 and the vehicle body frame 100 are easily fastened together, and a direct impact to the bolted or riveted portions is avoided during a side collision, ensuring accident safety.

In the present way, as the fastening rigidity between the reinforcing frame 300 and the vehicle body frame 100 is secured, the reinforcing frame 300 and the vehicle body frame 100 distribute the impact to the battery frame 200 during a side collision to reduce the impact transferred to the battery frame 200, and the reinforcing frame 300 can form a load path together with the vehicle body frame 100.

On the other hand, as illustrated in FIG. 6, the cross-reinforcing member 320 extends toward both side reinforcing members 310 on the upper side of the battery frame 200, and has, on both end portions thereof, an upper engaging portion 322 and a side engaging portion 323 engaged with an upper side and an internal side of the side reinforcing member 310.

That is, as the reinforcing frame 300 is positioned between the vehicle body frame 100 and the battery frame 200, the cross-reinforcing member 320 extends from the upper side of the battery frame 200 toward the side reinforcing member 310. Here, the upper engaging portion 322 and the side engaging portion 323 are formed at both end portions of the side reinforcing member 310 to be in contact with the upper and internal sides of the side reinforcing member 310. Accordingly, the cross-reinforcing member 320 has a strong support structure inside both the side reinforcing members 310, and is engaged with the internal and upper sides of the side reinforcing member 310 through the upper and side engaging portions 322 and 323.

In the meantime, as illustrated in FIG. 7, the reinforcing frame 300 further includes a connection bracket 330 connecting the cross-reinforcing member 320 and the first side sill section 119 to each other.

That is, by connecting the cross-reinforcing member 320 of the reinforcing frame 300 and the first side sill section 110 of the vehicle body frame 100 through the connection bracket 330, the fastening rigidity between the reinforcing frame 300 and the vehicle body frame 100 is secured. The connection bracket 330 may be coupled together with a seat mounting in the first side sill section 110 of the vehicle body frame 100. In the present way, the connection bracket 330 is connected to be located between the cross-reinforcing member 320 of the reinforcing frame 300 and the first side sill section 110 of the body frame 100, so that the fastening rigidity between the vehicle body frame 100 and the reinforcing frame 300 is increased, and the reinforcing frame 300 forms a load path with the first side sill section 110 by the connection bracket 330, so that a collision load generated during a side collision is distributed.

According to the vehicle body holding the high voltage battery having the structure as described above, a load path is formed by the reinforcing frame provided between the vehicle body frame and the battery frame and the battery frame is installed on the vehicle body frame via the reinforcing frame, improving the robustness and collision rigidity of the battery frame.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle body having a battery, the vehicle body comprising:
    a vehicle body frame having:
        a pair of first side sill sections extending in a longitudinal direction of the vehicle body and disposed on opposite sides of the vehicle body, respectively; and
        a pair of second side sill sections disposed outward and downward from the pair of first side sill sections, respectively, to define a mounting space for side parts, along with the pair of first side sill sections;
    a battery frame located below the vehicle body frame and having:
        side sections, between which the battery is configured to be accommodated; and
        a plurality of mounting features by which the battery frame is fastened to a lower portion of the vehicle body frame; and
    a reinforcing frame located between the vehicle body frame and the battery frame and having:
        a pair of side reinforcing members extending along the side sections of the battery frame on an external side from the side sections and fastened to the side sections and the pair of second side sill sections; and
        a cross-reinforcing member extending across the battery frame and coupled to the pair of side reinforcing members and fastened to a lower portion of the vehicle body frame by the plurality of mounting features,
    wherein the side sections are provided with a connection end portion extending downwards from the pair of side reinforcing members so that the connection end portion and the pair of side reinforcing members are fastened together.

2. The vehicle body according to claim 1, wherein the vehicle body frame is configured in a multipurpose vehicle in which the side parts including a sliding door or a door step are mounted in the mounting space.

3. The vehicle body according to claim 1,
    wherein the plurality of mounting features is disposed in the longitudinal direction in the battery frame, and
    wherein the cross-reinforcing member is in plural to include a plurality of cross-reinforcing members provided to connect the pair of side reinforcing members.

4. The vehicle body according to claim 3, wherein a predetermined number of cross-reinforcing members out of the plurality of cross-reinforcing members is coupled to the plurality of mounting features.

5. The vehicle body according to claim 4, wherein a predetermined number of mounting features out of the plurality of mounting features vertically penetrates through the predetermined number of the cross-reinforcing members to be coupled thereto.

6. The vehicle body according to claim 5, wherein a reinforcement rib is formed in the penetrated mounting features to surround the penetrated mounting features.

7. The vehicle body according to claim 6, wherein the reinforcing rib has an upward inclination, which is inclined with respect to an axis of a corresponding mounting feature.

8. The vehicle body according to claim 5, wherein a portion of the cross-reinforcing members through which the predetermined number of mounting features pass is disposed lower than another portion of the cross-reinforcing members through which the predetermined number of mounting features pass to form a convexly curved shape, so that a vertical load applied to the predetermined number of cross-reinforcing members is absorbed by the predetermined number of cross-reinforcing members.

9. The vehicle body according to claim 1, wherein the pair of side reinforcing members is provided with a fastening end portion extending downwards from the pair of second side sill sections so that the fastening end portion and the pair of second side sill sections are fastened together.

10. The vehicle body according to claim 9, wherein the side sections are provided with a connection end portion extending downwards from the pair of side reinforcing members so that the connection end portion and the pair of side reinforcing members are fastened together.

11. The vehicle body according to claim 10, wherein the fastening end portion is disposed between the connection end portion and the pair of second side sill sections in a horizontal direction of the vehicle body.

12. The vehicle body according to claim 1, wherein the cross-reinforcing member extends across the pair of side reinforcing members on an upper side of the battery frame, and the cross-reinforcing member has, on first and second end portions thereof, an upper engaging portion engaged with an upper side of the pair of side reinforcing members.

13. The vehicle body according to claim 1, wherein the cross-reinforcing member extends across the pair of side reinforcing members on an upper side of the battery frame, and the cross-reinforcing member has, on first and second end portions thereof, a side engaging portion engaged with an internal side of the pair of side reinforcing members.

14. The vehicle body according to claim 1, wherein the reinforcing frame further includes a connection bracket connecting the cross-reinforcing member and the pair of first side sill sections to each other.

15. The vehicle body according to claim 1,
wherein the battery frame further includes a front portion and a rear portion connecting the side sections on first and second sides of the battery frame, and
wherein the rear portion is formed to extend in a direction perpendicular to a longitudinal direction of the battery frame.

* * * * *